(12) United States Patent
Dumitriu et al.

(10) Patent No.: US 6,207,922 B1
(45) Date of Patent: Mar. 27, 2001

(54) ELECTRIC CONTROL FOR WELDING OPTICAL FIBERS

(75) Inventors: Ion Dumitriu, Nynäshamn; Ola Hultén, Bromma, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/953,193

(22) Filed: Oct. 17, 1997

Related U.S. Application Data

(63) Continuation-in-part of application No. 08/400,966, filed on Mar. 8, 1995, now abandoned.

(30) Foreign Application Priority Data

Mar. 8, 1994 (SE) .................................................. 94007796

(51) Int. Cl.⁷ .................................................. B23K 10/00
(52) U.S. Cl. .............................. 219/121.45; 219/121.46; 219/121.54; 385/96
(58) Field of Search .................. 219/121.43, 121.45, 219/121.46, 121.54; 118/723 AN; 204/298.17; 385/95, 96, 97, 98, 99

(56) References Cited

U.S. PATENT DOCUMENTS

| | | | |
|---|---|---|---|
| 4,052,585 | * 10/1977 | Sidyakin et al. | 219/137 R |
| 4,118,618 | * 10/1978 | Gauthie et al. | 219/121.45 |
| 5,002,351 | 3/1991 | Szanto et al. | |
| 5,013,345 | 5/1991 | Itoh et al. | |
| 5,046,813 | 9/1991 | Itoh et al. | |
| 5,170,456 | 12/1992 | Itoh et al. | |
| 5,216,223 | * 6/1993 | Straemke | 219/121.43 |
| 5,572,313 | 11/1996 | Zheng et al. | |
| 5,586,211 | 12/1996 | Dumitrou et al. | |
| 5,638,476 | 6/1997 | Zheng. | |
| 5,909,527 | * 6/1999 | Zheng | 385/96 |

FOREIGN PATENT DOCUMENTS

| | | |
|---|---|---|
| 37 24 914 | 2/1989 | (DE) . |
| 40 25 351 | 2/1992 | (DE) . |
| 504 519 | 9/1992 | (EP) . |
| 2 201 529 | 9/1988 | (GB) . |
| 63-106706 | 5/1988 | (JP) . |
| 2-6908 | 1/1990 | (JP) . |
| 9100979-5 | 4/1991 | (SE) . |
| 9100978 | 10/1992 | (SE) . |
| 9201817-5 | 12/1993 | (SE) . |
| 9201818-3 | 12/1993 | (SE) . |
| 9300522-1 | 9/1994 | (SE) . |
| 9201235-0 | 8/1995 | (SE) . |

OTHER PUBLICATIONS

I. Yokohama et al., "Fiber–Coupler Fabrication with Automatic Fusion–Elongation Processes for Low Excess Loss and High Coupling–Ratio Accuracy," *IEEE Journal of Lightware Technology*, vo. LT–5, No. 7, pp. 910–915 (Jul. 1987).

* cited by examiner

Primary Examiner—Mark Paschall
(74) Attorney, Agent, or Firm—Burns, Doane, Swecker & Mathis, L.L.P.

(57) ABSTRACT

In splicing optical fibers using an electric glow discharge generated between electrodes, the electric power in the glow discharge is maintained constant at varying ambient conditions, such as a varying atmospheric pressure. A signal representing the welding voltage is tapped at the middle terminal of a voltage divider circuit, and a signal representing the welding current is produced over a resistor. The signals are inputs to a multiplying circuit, the output signal of which is fed to one input of a comparator. A reference voltage is fed to the other input of the comparator. The error voltage from the comparator is an input signal to a control circuit providing a control signal to circuits for generating the voltage between the electrodes.

5 Claims, 5 Drawing Sheets

ELECTRIC CONTROL FOR WELDING OPTICAL FIBERS

The present application is a Continuation-in-Part of patent application Ser. No. 08/400,966 filed Mar. 8, 1995, now abandoned.

The present invention relates to electronic control in welding and/or heating optical fibers by means of an electric discharge, in particular a control of the electric quantities of the electric discharge.

BACKGROUND

When optical fibers are welded by means of the intense heat in an electric discharge the physical characteristics of the discharge change when the surrounding air pressure varies. Thus the electric voltage over the electrodes between which the discharge is formed is reduced when the air pressure decreases, which in turn results in a reduction of the electric current in the electric discharge and thus a lower temperature in the discharge region and thus in the region of the fibers heated by the discharge. It results in turn in inferior welded splices generally having a larger attenuation than splices welded at normal air pressure.

Thus, when welding optical fibers an electric discharge in air of atmospheric pressure is used, the discharge being self-igniting and self-sustaining and obtained when only applying a sufficiently high voltage between the cold, stationary welding electrodes, such a discharge being called a glow discharge, using the strict language of plasma physics. In the glow discharge electrons are emitted by secondary emission, principally owing to positive ions hitting the electrodes. When the current between the electrodes is increased from the values existing in the glow discharge, an arc discharge is obtained, and then the voltage between the electrodes is reduced to a very low value. A diagram illustrating the conditions when increasing from zero and on the voltage/current between two cold electrodes is shown in FIG. 1a. In region R1 a small voltage is applied over the electrodes and a very small current will then pass between the electrodes, which increases up to a saturation current. Region R2 is a transitional region reached when increasing the voltage even more and finally region R3 is reached which is the normal glow discharge region, producing a constant voltage between the electrodes called the burn voltage, the voltage in region R2 just before continuing to region R3 being called the ignition voltage. The glow voltage is determined by the exterior electrical circuit in which the electrodes are connected. When then increasing the current between the electrodes region R4 is obtained called abnormal glow discharge. Finally, in region R5 which is obtained when the current has been increased even more, an arc discharge is produced. In region R4 and even more in region R5 the high current density at the electrodes causes a heating thereof, finally resulting in that the negative electrode, the cathode, is so hot that electrons are emitted thermally and that the electrode voltage reaches a few or some ten of volts. The region R5 is used for ordinary welding of metals or similar materials, the initial heating of the negative electrode then being accomplished by heat generated in a contact resistance between the electrodes or between an electrode and the material to be welded, so that no high voltage is ever applied.

Different ways for compensating variations in the exterior air pressure when welding optical fibers using a glow discharge have been proposed:

The published European patent application EP A1 0 504 519 for Fujikura Ltd. discloses an optical fiber welding device comprising a discharge unit 2 for obtaining an electric discharge for melt-fusioning optical fibers, a pressure sensor 6 for providing a signal corresponding to the ambient atmospheric pressure and a "discharge control unit 3" for controlling the discharge in relation to the pressure signals so that to the discharge unit 2 an optimal current is delivered during the discharge. By using feedback through a line from a resistor 251 in the welding electrode circuit the welding current can be maintained constant. The Japanese patent application JP A 63-106706, which is available to the public, also for Fujikura Ltd. relates to an optical fiber welding device of a similar kind.

The German patent application DE A1 37 24 914 made available to the public, for kabelmetal electro GmbH, describes a procedure for connecting two optical fibers by means of the energy from an electric discharge. The procedure comprises among other things a control of the (gas) pressure which exists around the electric discharge and of the current through the electric discharge.

U.S. Pat. No. 5,002,351 for Szanto et al. relates to a melt welding device for optical fibers where it, according to the abstract, is arranged that "Once an arc is established between opposed electrodes, constant power is provided during the splicing." From the specification of this patent it is not apparent what is meant by "power" of how "constant power" can be achieved.

SUMMARY

It is an object of the invention to provide means whereby a good quality of welded splices and thus splices having a low attenuation and a good strength can be obtained when welding optical fibers to each other using an electric discharge.

It is another object of the invention to provide a control of the electric quantities in an electric discharge which is used for welding optical fibers together, so that essentially the same quality of a finished splice is obtained at a varying surrounding air pressure.

These objects are achieved by a method and a device according to the invention, the detailed characteristics of which appear from the appended claims.

Thus, in welding optical fibers a glow discharge between welding electrodes is used, and in the discharge region the ends of the fibers are located to be heated by the energy of the discharge. The electric power developed in the electric discharge is fed back to a control unit controlling the heating process. The electric power is measured for instance as a product of a voltage which corresponds to an average value of the rectified, for instance full wave rectified, voltage, between the welding electrodes and a current which in the same way corresponds to an average value of the rectified, for instance full wave rectified, current flowing in the discharge from one electrode to the other.

A first voltage can then be produced which is proportional to the instantaneous electric power developed in the electric discharge when making the welding. It is fed back to a control circuit for controlling circuits for generating the high voltage over the electrodes, so that the electric power is maintained substantially constant during the welding operation. Then, a second voltage can be produced which is representative of or proportional to the electrical current between the welding electrodes, and a third voltage which is representative of or proportional to the voltage over the welding electrodes. The second and third voltages are multiplied by each other in a multiplying circuit for generating the first voltage.

BRIEF DESCRIPTION OF THE DRAWINGS

The invention will now be described in greater detail by way of non-limiting embodiments with reference to the accompanying drawings, in which.

DETAILED DESCRIPTION

Figure 1A:
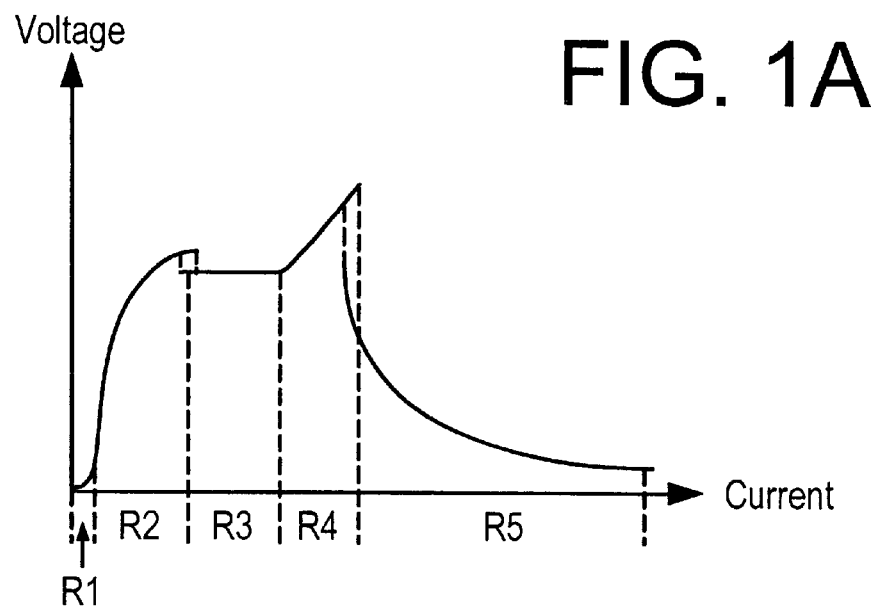
FIG. 1a is a diagram schematically illustrating the voltage as function of the current for two electrodes.
Figure 1B:
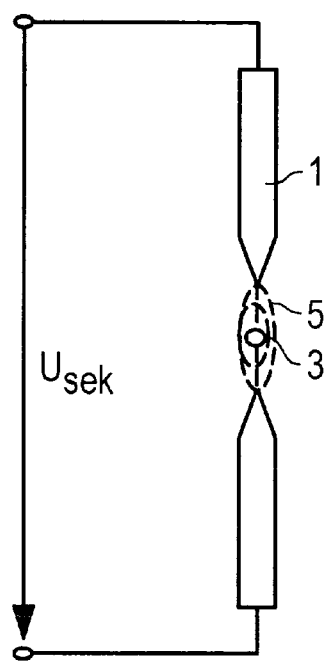
FIG. 1b is a schematic picture, as seen in the transverse direction of the fibers, illustrating welding of optical fibers in an electric glow discharge.

In FIG. 1b it is shown schematically, as seen from the side, fixed or stationary electrodes 1 connected to a voltage $U_{sec}$, the electrodes being used for welding or in certain cases only heating one or several optical fibers 3 basically made of quartz, the welding or heating being made by using an electric glow discharge 5 generated between the points of the electrodes 1. The optical fiber or fibers to be heated and/or welded have e.g. its end/their ends located in the centre of the plasma generated between the electrode points where the highest temperature is obtained. Generally, when using the electric glow discharge 5 for heating optical fibers an alternating voltage is used, so that the voltage $U_{sec}$ typically varies periodically.

Figures 2A, 2B:
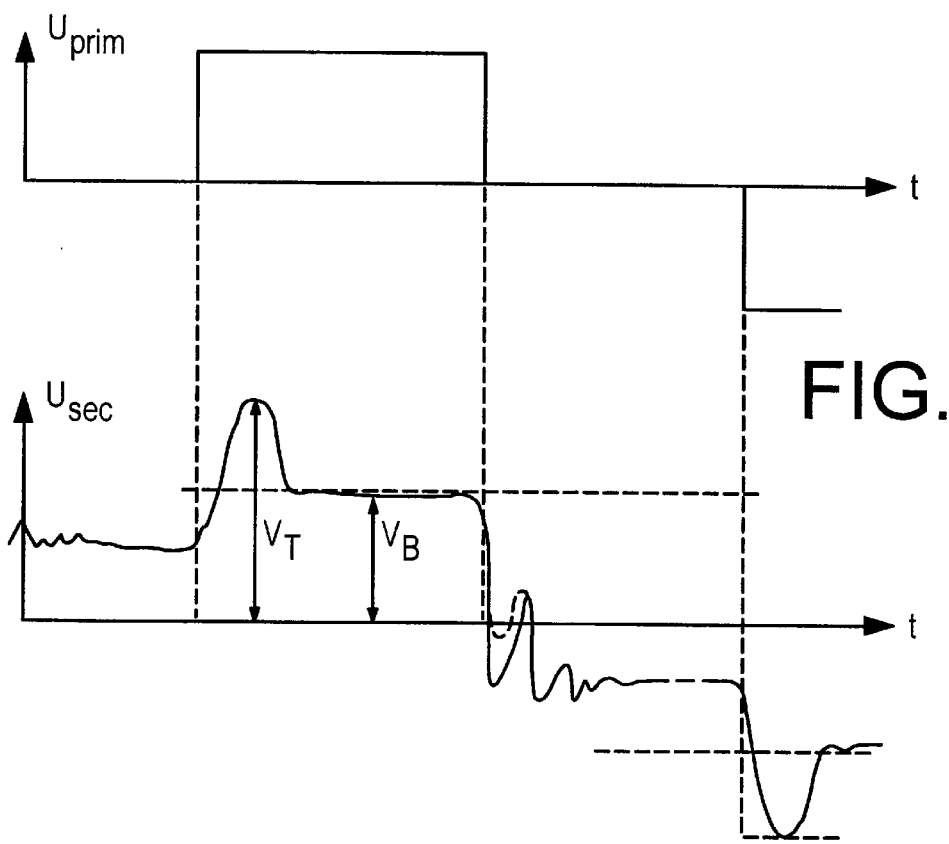
FIGS. 2a and 2b are diagrams of voltages as a function of time in welding optical fibers, FIG. 2a showing voltage pulses fed to a high voltage transformer and FIG. 2b showing the behavior of the electrode voltage produced by the voltage pulses of FIG. 2a, FIG. 3 is a diagram of an important electrical quantity in the electrode voltage as a function of the ambient air pressure.
Figure 5:
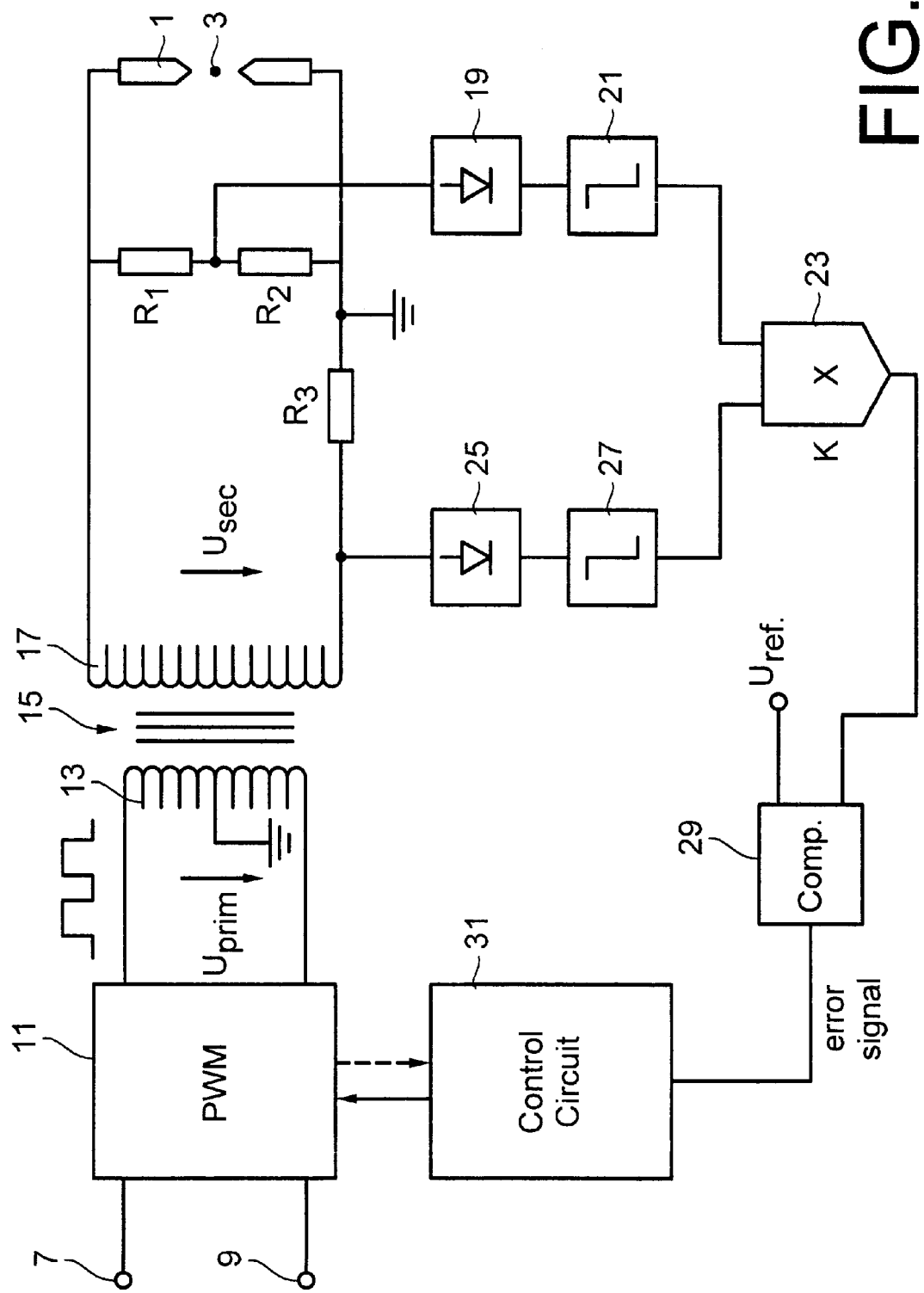
FIG. 5 is a circuit diagram, partly in block shape, of an electric circuit for generating an electric discharge for welding optical fibers.

The voltage $U_{sec}$ is normally obtained from the high voltage, secondary winding of a transformer, to which a pulse shaped voltage $U_{prim}$ is delivered to the primary winding thereof, see FIG. 5 and the detailed description of this figure. In FIG. 2a a diagram is shown of the activating voltage $U_{prim}$ as a function of time and in FIG. 2b a diagram of the secondary voltage $U_{sec}$ obtained therein over the secondary winding of the transformer and between the electrodes 1.

The primary voltage $U_{prim}$ comprises in the typical case periodically recurrent, identically shaped positive and negative square or rectangular voltage pulses of a rather high amplitude, the width of the pulses (pulse width modulation) being changed in order to drive a current of varying magnitude between the electrodes 1 in the electric glow discharge 5 or equivalently thereto change the generation of electric power in the electric discharge 5. It can also be considered to use a change of the pulse heights instead (amplitude modulation) for driving a variable electric current (also for generating a varying electric power in the electric discharge) between the welding electrodes 1. The frequency of the pulses are typically in the range of 20–30 kHz.

Owing to the special physical processes in the electric discharge 5 the secondary voltage $U_{sec}$, i.e. the voltage over the electrodes 1, has a rather complicated behavior, which is illustrated as a function of time in FIG. 2b, see also the above discussion of FIG. 7. It can be observed, that in the ignition of the electric discharge first a large short voltage pulse occurs over the electrodes 1, having the magnitude $V_T$, called the ignition voltage, after which an approximately constant, weakly decreasing voltage is obtained, having an average voltage of the magnitude $V_B$ and being called the burn voltage. It is maintained as long as the voltage between the electrodes 1 still has the same polarity, i.e. to the end of the corresponding driving pulse in $U_{prim}$.

The glow discharge used in welding and heating optical fibers is distinct from the arc discharge used for welding metals and similar materials. In arc welding a very small voltage is used compared to the amplitude of the pulses according to FIG. 2a which have an amplitude of e.g. 1 kV. Furthermore, in arc welding usually a direct current is used or an alternating current having e.g. at most a frequency of 50–60 Hz, to be compared to the frequency used in welding optical fibers which comprises tens of kilohertz. A very high current and current intensity are used in arc welding and the arc is ignited by moving the electrodes in contact with each other. Physically, the plasma obtained between the electrodes in an arc discharge is completely ionized resulting in a resistance between the electrodes of nearly 0 ohm, whereas in a glow discharge the plasma is only partially ionized, about 50%, the resistance between the electrodes and the current varying with the applied voltage. In a glow discharge the temperature in the discharge region, in the partially ionized plasma, can be controlled with a high accuracy. Also the transformers used for generating arc discharges and glow discharges are different—usually a transformer used for arc welding has a secondary voltage which is lower than the primary voltage whereas for glow discharges used for heating the primary voltage is much lower than the secondary voltage, the number of turns used in the windings of the transformer being correspondingly adapted.

Figure 3:
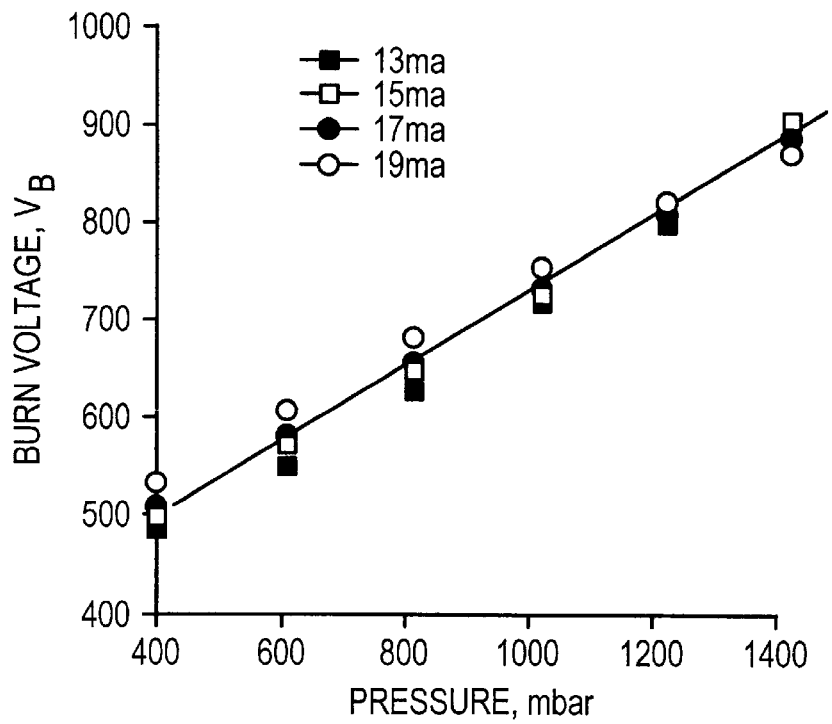

For changes in the ambient air pressure around an electric glow discharge variations occur in the electric characteristic properties of the electric discharge. An example thereof is illustrated in the diagram of FIG. 3, where the burn voltage $V_B$ is plotted as a function of the ambient air pressure for a constant electric current between the electrodes and thus in the electric discharge 5. As is illustrated by the curve of this diagram, the burn voltage $V_B$ is essentially linearly dependent on the ambient pressure.

Figure 4:
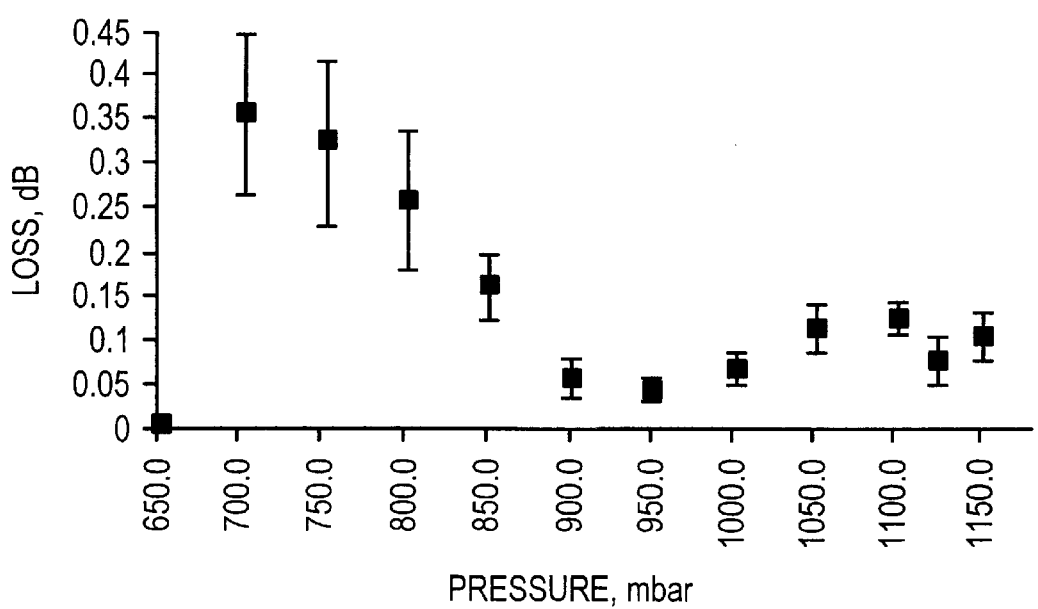
FIG. 4 is a diagram of the attenuation of loss in splices between optical fibers produced at a constant electrode voltage as a function of the ambient air pressure.

The different variations in the electrical conditions for varying air pressure influence the physical conditions in the electric glow discharge 5. Thus, if an optimal welding current is set to an initial value for some ambient air pressure, so that the attenuation in a splice made by means of the electric discharge, between two optical fibers 3 for this welding current and for this air pressure is given a minimum attenuation, the attenuation will increase in a welded splice made with this same welding current, when the air pressure is changed. It is illustrated by the diagram of FIG. 4, where the loss or attenuation in a fiber splice is plotted as a function of the ambient air pressure for a constant welding current, which is set to give a low attenuation for an air pressure of 950 mbar.

In order to compensate the effects of varying pressures, in prior art welding devices the driver circuits for the electric discharge have been arranged so that an essentially constant welding current is obtained. However, this method does not always give a correct desired result, i.e. the splices made have not always a low attenuation if they are made at different atmospheric pressures. It has appeared, that if instead the electric power generated in the electric discharge is maintained constant in the production of fiber splices for varying air pressures, a better stability will be obtained and then approximately the same low attenuation will be obtained in splices made for different ambient air pressures, provided that, in the corresponding manner as above, the electric power has been set to give a low attenuation in fiber splices for an initial value of the ambient air pressure.

A circuit solution for maintaining the electric power in the welding discharge constant is shown in FIG. 5 as included in an electric circuit which is partly shown in block shape and is designed for generating the electric discharge 5 for welding optical fibers 3. A direct voltage is supplied to the terminals 7 and 9. This voltage is received by a pulse width modulating circuit 11, which to the primary winding 13 of a transformer 15 outputs a voltage $U_{prim}$ comprising pulses, see FIG. 2a, the width of which is controlled, i.e. pulse width modulation is used.

As has been mentioned above, alternatively amplitude modulation can be used, wherein the height of the pulses in the primary voltage $U_{prim}$ are controlled.

In the transformer 15 the voltage $U_{prim}$ over the primary winding 13 is transformed to a high voltage $U_{sec}$ over the secondary winding 17. Over the secondary winding principally a square or rectangular wave voltage is induced having the same general behavior as the primary voltage, see FIG. 2a, which by the electric discharge is changed into the secondary voltage $U_{sec}$ according to FIG. 2b. The two terminals of the secondary winding 17 are connected to the two welding electrodes 1, between which the electric glow discharge 5 is formed for heating and/or welding an optical fiber or optical fibers 3 located between the points of the electrodes 1, substantially in the center between the points.

The secondary voltage $U_{sec}$ is rather high, typically in the range of 500–1000 volts, and is not suitable for a direct evaluation. Therefor a small voltage is extracted, which is proportional to the voltage $U_{sec}$ over the secondary winding 17, at the middle connection of a voltage divider circuit. The voltage divider circuit comprises two resistors $R_1$ and $R_2$, which have their other terminals coupled to the electrodes 1 or the terminals of the secondary winding 17. The second one of these resistors, $R_2$, has its other terminal coupled to ground. The extracted voltage, i.e. the voltage over $R_2$, is rectified by an active, full wave rectifier or measurement rectifier 19. The rectifier 19 is designed to rectify also small voltage signals and can in the conventional way be constructed as for instance comprising an operational amplifier having a diode in the feed back loop. The rectified voltage is filtered in a low pass filter 21 for eliminating too rapid voltage variations. These voltage variations can primarily comprise ripple derived from the electronic circuits but also the pulses obtained at igniting the electric discharge between the electrodes, i.e. the pulses having heights equal to the ignition voltage $V_T$, see FIG. 2b. The rectified and filtered voltage is delivered to one terminal of a multiplier circuit 23 in the shape of a smoothed direct voltage, which reflects the average level of the voltage pulses in the secondary voltage $U_{sec}$, i.e. essentially the burn voltage $V_B$, which depends on the ambient air pressure.

A voltage proportional to the electric current through the secondary winding 17 and through the welding electrodes 1, i.e. proportional to the welding current, is extracted in the conventional way by the method that a resistor $R_3$ is arranged serially in the circuit comprising the secondary winding 17 and the electrodes 1 and that this resistor has one terminal connected to ground. From the other terminal of this resistor $R_3$, which is also connected to one terminal of the secondary winding 17, the voltage is extracted and is processed in the same way as the extracted voltage described above, which represents the secondary voltage. Thus the voltage is first rectified by an active, full wave rectifying circuit or measurement rectifier 25 and is filtered by a low pass filtering circuit 27. The rectified and filtered voltage thus obtained is proportional to the welding current and is delivered to a second input terminal of the multiplier circuit 23.

The multiplier circuit 23 is designed for multiplying the two voltages which are fed to its inputs and provides a result on a third line, its output, so that the voltage on this output line is proportional to the product of the two delivered voltages and thus generally is equal to the product of these two voltages multiplied by a factor K.

The product voltage is then fed to one connection of a comparator 29, to the other input of which a reference voltage or control voltage $U_{ref}$ is provided in some suitable way, not shown, such as in the simplest conceivable case from some manually adjustable potentiometer circuit (not shown). A comparator 29 provides on its output a voltage which is proportional to the difference of the voltage over the two inputs thereof. The signal from the comparator 29 is provided to a control circuit 31, which is arranged to control the pulse width modulating circuit 11. To the latter circuit such control signals are provided, that the pulse width is adjusted, so that the error signal on the input to the control circuit will be as small as possible.

In this way the product of voltage and current in the secondary circuit comprising the electric discharge is fed back, so that this product is maintained constant. The product is porportional to the electric power generated in the secondary circuit of the transformer 15, i.e. substantially to the electric power generated in the electric discharge 5. By the feedback and the maintaining of a voltage, which is proportional to the power, at a constant value the circuit is, as has been mentioned above, less sensitive to variations in the ambient pressure and a low attenuation is maintained in fiber splices made at varying air pressures.

Figure 6:
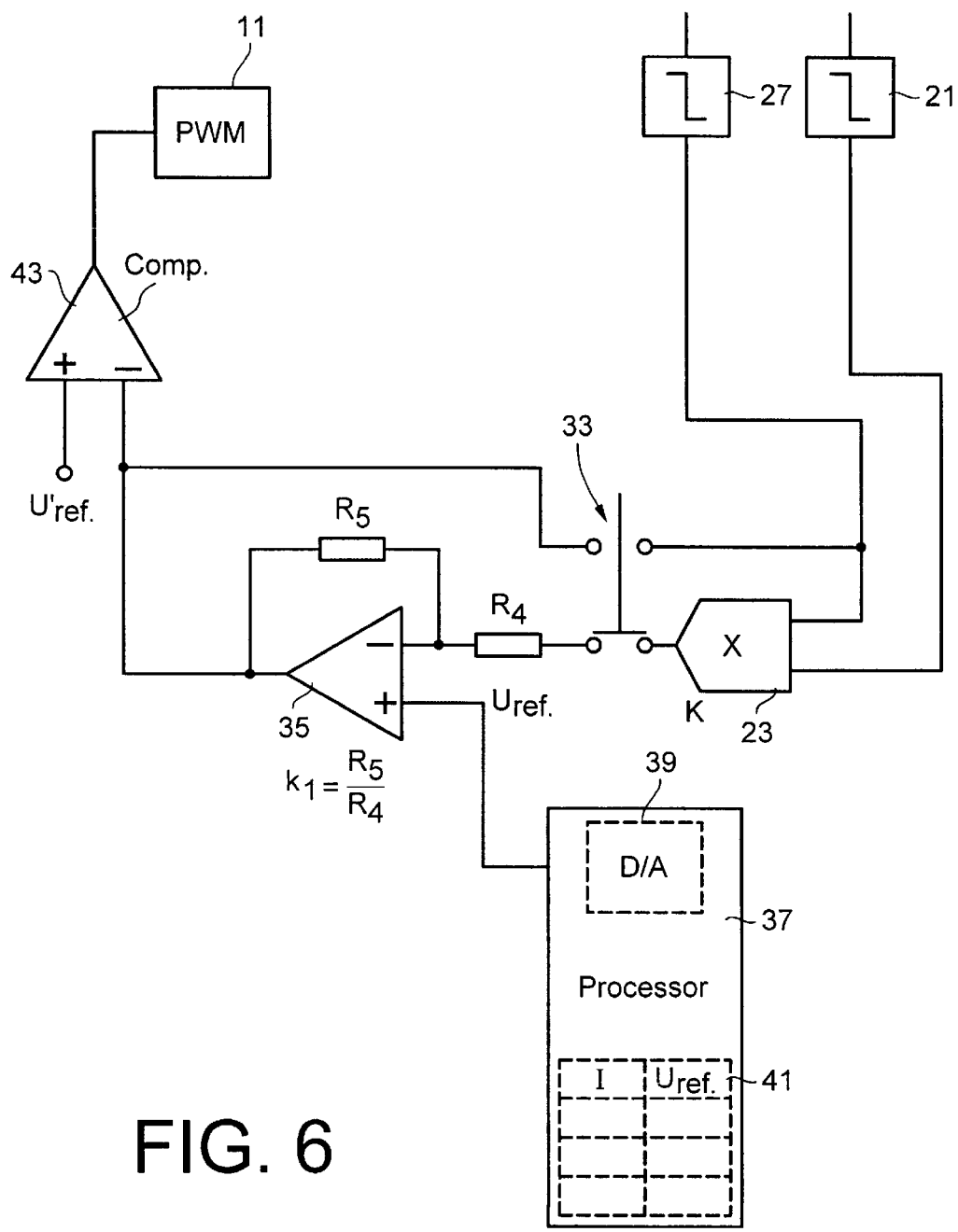
FIG. 6 is a circuit diagram of an alternative embodiment of a portion of the circuit diagram of FIG. 5.

In FIG. 6 an alternative, more detailed circuit solution is illustrated for a portion of the circuit according to FIG. 5. The output from the multiplier circuit 23 is here connected to a switch 33, which in its normal position forwards the output signal from the multiplier circuit 23 through a resistor $R_4$ to the inverting input of an operational amplifier 35, which is connected as an amplifier having a gain $k_1$ as determined by the ratio $R_5/R_4$. $R_5$ is a resistor which is connected between the same inverting input of the operational amplifier 35 and the output thereof. To the not inverting input of the operational amplifier 35 the reference voltage $U_{ref}$ is provided. It is obtained from a processor 37, which is used for control of the total welding procedure by means of also other devices not shown here. The voltage variations on the output of the operational amplifier 35 are proportional, as given by the mentioned constant of $K_1$ of proportionality, to the variations of the difference between the potentials on the inputs of the operational amplifier 35.

The processor 37 contains a D/A converter 39 for generating the analog signal $U_{ref}$ and a memory 41 for a table, where for each welding type, as given by a suitable welding current I, the corresponding reference value $U_{ref}$ is stored. The reference value $U_{ref}$ determines by means of the circuit as illustrated the power generation in the electric discharge.

The output of the operational amplifier 35 is further connected to the inverting input connection of a comparator 43, which is comprised in the control circuit 31 of FIG. 5. To the other input terminal of the comparator 43, the not inverting input thereof, a second reference voltage $U'_{Ref}$ is fed. The output signal from the comparator 43 is proportional to the difference of the voltage existing over its inputs and is provided to the pulse width modulating circuit 11.

When changing the state of the switch 33 the multiplier circuit 23 is disconnected and instead the voltage from the low pass filter 27, which represents the current in the electric discharge, is directly delivered to the inverting input of the comparator 43. It gives a control of only the welding current, so that it will be maintained constant during the welding. Such a control can be necessary to arrange, when a control of the consumed power does not work, such as for instance when the points of the electrodes 1 are in too bad conditions.

What is claimed is:

1. A device for splicing two ends of optical fibers by welding, comprising:

means for generating a glow discharge between two electrodes, first means for producing a voltage which is proportional to an electric current through the electrodes, wherein the first means comprises a first resistor placed in a line connected to one of the two electrodes to produce over the resistor a first voltage that is proportional to the electric current through the two electrodes, second means for producing a voltage, which is proportional to the electric voltage over the electrodes, wherein the second means comprises two second resistors connected in series with each other in a line parallel with the two electrodes to produce at a connection point between the two resistors a second voltage that is proportional to the electric voltage over the two electrodes, means for multiplying these two proportional voltages by each other, wherein the multiplying means comprises means connected to the first resistor and the connection point of the second resistors to receive the first and second voltages and to produce a third voltage that is proportional to the product of the first and second voltages and that is thereby proportional to the electric power in the glow discharge, and means for maintaining the electric power in the glow discharge electric arc substantially constant during the welding, wherein the maintaining means is connected to the multiplying means for receiving the third voltage and maintains the third voltage substantially constant during welding, whereby the electric power in glow discharge electric arc is maintained substantially constant during the welding.

2. A device according to claim 1, wherein the multiplying means comprises a multiplier circuit having two inputs and an output, the inputs of which are connected to the voltage producing means and on the output of which a voltage signal is provided, which is proportional to the product of the voltages, which are present on the inputs thereof.

3. A device according to claim 2, wherein the output terminal of the multiplier circuit is connected to an input of a comparator, a line is connected to another input of the comparator from a means for generating a constant reference voltage, and an output form the comparator is connected to a control circuit for control of an electric driver device for the electrodes.

4. A device according to claim 3, wherein the means for generating a constant reference voltage are arranged to generate different constant reference voltages depending on the type of optical fibers which are to be spliced.

5. The device of claim 1, wherein generating means comprises means for applying an alternating current (a.c.) to the electrodes and igniting the glow discharge electric arc by increasing an a.c. voltage applied to the electrodes.

* * * * *